3,491,115
COMPOSITION FOR DEGELLING RESINS
Jack L. Harrier, Lansing, assignor to Standard Oil Company, Chicago, Ill., a corporation of Indiana
No Drawing. Filed Oct. 28, 1966, Ser. No. 590,180
Int. Cl. C08g 51/44
U.S. Cl. 260—32.6
2 Claims

ABSTRACT OF THE DISCLOSURE

A method for degelling polyesterification condensation reaction gels is disclosed which comprises mixing into said gels a composition comprising 25–65% of a liquid hydroxy alkyl amine and 15–50% of a liquid polyhydroxy compound.

---

This invention is a composition having particular utility for degelling condensation resins which comprises a high boiling amine and one or more polyhydroxy compounds. More particularly, this invention is a composition of a high boiling hydroxy alkyl amine and one or more glycol derivatives which will solubilize and dilute condensation resins undergoing gelation.

In the preparation of condensation resins such as alkyd resins and polyester resins, it is not uncommon for gelation to occur in the reaction vessel, often necessitating a time-consuming and expensive cleaning operation. These gels may form a consequence of physical operations, such as inaccurate formulation of the starting materials or poor technique in the workup. The gels may also form as a consequence of chemical reactions being carried too far in terms of acid number of the resin and its effect upon viscosity. These gelation accidents are familar to those skilled in the art of preparing condensation resins of the polyesterification type and there are techniques used to combat the problem. For example, it is known to boil caustic soda solution in the reactor where gelation of a polyester condensation resin has occurred. It is also known to agitate the gelling mass upon perceiving onset of gelatin, with large amounts of glycols or aromatic solvents, in order to dilute the mass. These methods have disadvantages. For instance, hot caustic soda is a hazardous material to handle and, as regards solvent dilution, there is a limitation imposed by the size of the reaction vessel so that it may not be possible to add sufficient solvent to put the gelling resin in solution and prevent a congealing of difficultly removable matter in the reaction vessel.

I have found that the novel degelling compositions of my invention can be used without harm to the ordinary equipment employed for polyester condensation reaction and that relatively small amounts are required to cut back a gel which has begun to form. Further, depending upon the boiling point of the components of my novel compositions, these degelling compositions can be used at temperatures normally employed for condensation reactions and up to about 520° F. Such novel compositions comprise a high boiling amine and one or more glycol derivatives.

The amines useful in the practice of my invention are those of high boiling point, by which I mean amines boiling from about 300° F. and higher. The useful compounds are desirably liquid at room temperature, though solid amines, which are soluble in the other component or components of my novel composition, can be used as equivalents thereof. The presence of other functional groups in the useful amines is not necessarily deleterious or prohibitive of their use in my novel compositions. I have, in fact, found that hydroxy alkylamines are the preferred compounds, since these are relatively non-toxic and have, by reason of the hydroxy groups, increased boiling points as compared to non-hydroxy-containing amines. The amine functions as a solubilizing agent in the novel composition and any amines possessing this solubilizing property are suitable. Among the useful alkylamines are such as octylamine and decylamine. Among the useful aromatic amines are such as aniline and aminopyridine. Among the desirable hydroxy alkylamines are such as monoethanolamine, diethanolamine, triethanolamine and similar compositions containing alkyl groups of greater carbon number, desirably normally liquid, and mixtures of such. My preferred amine component is triethanolamine. This compound has especial desirability because of its relatively unobjectionable odor as compared to many other amines.

The amount of amine to be employed in my total composition is desirably from 25 to 65 percent by weight, compositions containing less than 25 percent by weight being relatively less effective and those containing from 50 to 65 percent by weight being relatively more effective. The upper limit of the amine concentration is fixed by the desirability for introducing appreciable amounts of excess hydroxyl radicals by way of the additional components and by the desirability of having sufficient glycol derivatives for effective dilution of a gelled condensation resin. I have found that from 40 to 60 percent of the amine component affords, generally, an especially suitable composition and have found particularly effective those compositions containing about 50 percent of the amine.

The polyhydroxy compound portion of my novel composition provides excess hydroxyl groups for reaction with a condensation resin undergoing gelation so as to reduce the formation of long resin molecules. It also acts as a diluent for the condensation resin. Particularly useful polyhydroxy compounds are glycol derivatives having relatively high boiling points, by which I mean boiling points from about 300° F. and higher. These compounds should be liquid at normal temperature for ease of use and if they are viscous liquids, can be rendered more suitable for use by addition of glycol ethers, as will be disclosed hereinafter. Liquid polyhydroxy compounds are well known to workers in this art and no detailed recitation of them is necessary for an understanding of my invention. The selection of a polyhydroxy component will depend to a considerable extent upon cost and availability. For that reason, a compound such as glycerol is less desirable than glycol derivatives such as diethylene glycol, triethylene glycol, dipropylene glycol, polyether glycols of 10 to 100 carbon atoms, mixtures of the foregoing materials, and the like. My preferred compound is dipropylene glycol made from 1,2-propylene glycol. The amount of the polyhydroxy compound to be used in conjunction with the amine to form my degelling composition can be in the range of 0 to 75 percent by weight. I have found that from 15 to 50 percent by weight is desirable and prefer to use about 25 percent by weight of such compounds in the total composition.

When the glycol derivative, as described hereinabove, is difficult to mix with the amine component of my composition so as to produce a homogeneous solution, or when the aforementioned two components are of relatively high viscosity before or after mixing, it is desirable to add a third component, which is a glycol ether. The glycol ethers used alone with the amine are not so desirable as the diglycol compounds discussed hereinabove, since they contain relatively fewer hydroxyl groups. They can, however, be desirable for their solubilizing and diluting action and for such purposes I find the Carbitol type of compounds to be particularly useful. In addition to Carbitol, which is the ethyl ether of diethylene glycol, the methyl, ethyl and propyl ethers are useful, as are the corresponding ether homologues of dipropylene glycol. These materials may be present in amounts ranging from 0 to about 75 percent by weight of the total degelling composition. I have found that from 15 to 50 percent by weight is desirable and prefer to use about 25 percent by weight of such compounds in the total composition.

The use of my novel degelling compositions is simple. When a condensation reaction of the polyesterification type begins to undergo gelation, as evidenced by visually apparent changes or by a noticeable increase in viscosity which affects agitation, and it is apparent that the reaction vessel will be clogged with gelled matter, the operator of the condensation reaction adds about 5 percent by weight of degelling composition to the reactor, while continuing agitation. Smaller amounts of degelling composition can be effective if the gelation reaction has not progressed very far and larger amounts, of course, are completely effective, though they may be unnecessarily wasteful of material. Thus, I prefer to use about 5 percent of my degelling composition under usual circumstances. The conditions of application of my novel composition and its utility will be made more apparent by reference to the following examples wherein the cooking schedule for unsaturated polyester, medium oil length and long oil alkyd resins which underwent gelations is set forth, along with the response of these systems to addition of degelling composition in accordance with my invention. The specific degelling composition exemplified contained 50 weight percent of triethanolamine, 25 weight percent of dipropylene glycol and 25 weight percent of butyl Carbitol.

EXAMPLE 1

Into a resin kettle there was placed 498 g. of Amoco brand isophthalic acid, 464 g. of furmaric acid, 594 g. of diethylene glycol and 98 g. of ethylene glycol. This mixture was agitated and heated according to the schedule in Table I, with reflux head temperature as indicated and removal of water as shown. The acid number, when determined, is shown in Table I along with observations of the operator.

TABLE I.—COOKING PROCEDURE

| Time | Kettle Temp. (° F.) | Head Temp. (° C.) | Distillate, mls. | Acid No. | Remarks |
|---|---|---|---|---|---|
| 10:00 | Room | Room | | | Heat on. |
| 10:30 | 390 | 95 | | | |
| 11:00 | 420 | 98 | 55 | | |
| 11:30 | 445 | 96 | 80 | | |
| 11:45 | 450 | 94 | 92 | | Add Fumaric. |
| 12:00 | 400 | 97 | 190 | | |
| 12:30 | 440 | 98 | 220 | | |
| 1:00 | 450 | 90 | 235 | | |
| 1:30 | 450 | 78 | 242 | | Vent. |
| 2:30 | 450 | | | 27.4 | |
| 3:00 | 450 | | | 25.7 | |
| 3:30 | 470 | | | 20.0 | |
| 3:45 | 490 | | | | Gell. |
| 3:50 | | | | | Add 70 g. degelling compound. |
| 4:00 | | | | | Gelled material completely liquefied; discarded. |

It is apparent from the above example that my novel degelling compound constitutes a facile corrective in the event of runaway polyesterification condensation reactions.

EXAMPLE 2

The preparation of a medium oil length resin was undertaken by adding to a resin kettle 463 g. of tall oil fatty acid, 238 g. of trimethylolethane, 263 g. of phthalic anhydride and 97 g. of trimellitic anhydride. The cooking procedure for this mixture is set forth in Table II along with observations of the operator.

TABLE II.—COOKING PROCEDURE

| Time | Kettle Temp., (° F.) | Remarks |
|---|---|---|
| 11:00 | Room | Charge oil, trimethylol ethane and phthalic anhydride. |
| 12:15 | 410 | Reach 410° F. |
| 4:00 | 410 | Temp. off at 4:00. |
| 8:15 | Room | Temp. on. |
| 10:30 | 480 | Reach 480° F. |
| 12:50 | 480 | Acid No. less than 10, fade heat. |
| 1:45 | 310 | Add trimellitic anhydride. |
| 2:20 | 370 | Reach 370° F. |
| 3:40 | 420 | Reach 420° F.—gel. Add 75 g. degelling compound. Gel was broken up such that it could be poured from kettle. |

It is apparent from the above example that my novel degelling composition is effective for destroying gels which inadvertently occur in the preparation of medium oil length resins.

EXAMPLE 3

This shows the applicability of my novel degelling composition in the preparation of a meidum oil length resin having different components from that of Example 2. Into a resin kettle there was introduced 400 g. of soya oil, 210 g. of glycerine, 0.2 g. of litharge, 382 g. of isophthalic acid and 107 g. of benzonic acid. This mixture was cooked according to the schedule set forth in Table III, which also reproduces the observations of the operator.

TABLE III.—COOKING PROCEDURE

| Time | Kettle Temp., (° F.) | Remarks |
|---|---|---|
| 9:10 | Room | Charge oil and glycerine. |
| 9:40 | 460 | Reach 460° F., add litharge. |
| 11:10 | 460 | Add isophthalic acid. |
| 11:15 | 410 | Add benzoic acid. |
| 12:30 | 460 | Reach 460° F. |
| 1:00 | 500 | Reach 500° F., gel. |
| 1:01 | | Add 75 g. degelling compound. Gell was broken up such that it could be poured from kettle. |

It is apparent from the above example that my novel degelling composition has utility for preventing the complete gelation of a medium oil length resin.

EXAMPLE 4

This example demonstrates the usefulness of my novel degelling composition when a long oil alkyd resin preparation began to gel. Into a resin kettle there was introduced 850 g. of linseed oil, 64 g. of trimethylolpropane, 0.2 g. of litharge and 110 g. of terephthalic acid. This mixture was cooked according to the schedule set forth in Table IV, where there are also set forth the observations of the operator.

TABLE IV.—COOKING PROCEDURE

| Time | Kettle Temp., (° F.) | Remarks |
|---|---|---|
| 8:15 | Room | Charge oil and trimethylol propane. |
| 9:15 | 450 | Reach 450° F.; add litharge. |
| 10:15 | 450 | Add terephthalic acid. |
| 12:10 | 470 | Reach 470° F. |
| 12:30 | 520 | Reach 520° F., gel. |
| 12:31 | | Add 50 g. degelling compound. Gel was completely broken and poured from kettle. |

In similar fashion, degelling compositions containing greater and lesser amounts of amines and polyhydroxy compounds and degelling compositions containing different amines and different polyhydroxy compounds from those specifically exemplified in the foregoing examples, but within the scope of the definition of my invention set forth herein, can be employed for degelling resins resulting from condensation reactions. Variations and modifications of my invention can be made within the scope of the invention by workers of ordinary skill in this art and the many possible variations and modifications are consequently not set forth in detail here.

Having thus defined my invention, what I claim is:

1. A method for degelling polyesterification condensation reaction gels which comprises mixing into said gels a composition comprising:
   (a) from about 25 to 65 percent by weight of a normally liquid hydroxy alkyl amine having a boiling point in excess of 300° F., selected from the group consisting of monoethanol amine, diethanol amine, triethanol amine and mixtures thereof, and
   (b) from about 15 to 50 percent by weight of a normally liquid polyhydroxy compound derived from a glycol having a boiling point in excess of 300° F. selected from the group consisting of glycerol, diethylene glycol, triethylene glycol, dipropylene glycol, polyether glycols of 10 to 100 atoms and mixtures thereof in amounts sufficient to reduce said gels to a flowable condition.

2. The method of claim 1 wherein said composition comprises from about 50 to 65 percent by weight of triethanol amine and from about 15 to 35 percent by weight of dipropylene glycol and from about 15 to 35 percent by weight of butyl Carbitol.

References Cited

UNITED STATES PATENTS

| | | | |
|---|---|---|---|
| 3,309,327 | 3/1967 | Gayer | 260—32.6 |
| 2,664,367 | 12/1953 | Lumley | 260—32.6 |
| 2,840,536 | 6/1958 | Fuchs | 260—32.6 |

OTHER REFERENCES

Bjorksten: "Polyesters," 1956, 52, 56–58.

MORRIS LIEBMAN, Primary Examiner

P. R. MICHL, Assistant Examiner

U.S. Cl. X.R.

260—33.2